April 10, 1928.

T. C. FORBES

BREAD TOASTER

Filed Jan. 5, 1927

Inventor
THOMAS C. FORBES
By Paul, Paul & Moore
ATTORNEYS

Inventor
THOMAS C. FORBES
ATTORNEYS

April 10, 1928.

T. C. FORBES

BREAD TOASTER

Filed Jan. 5, 1927

Inventor
THOMAS C. FORBES
By Paul, Paul & Moore
ATTORNEYS

April 10, 1928.

T. C. FORBES

BREAD TOASTER

Filed Jan. 5, 1927

Inventor
THOMAS C. FORBES

By Paul, Paul & Moore
ATTORNEYS

Patented Apr. 10, 1928.

1,665,735

UNITED STATES PATENT OFFICE.

THOMAS C. FORBES, OF HOPKINS, MINNESOTA, ASSIGNOR TO WATERS-GENTER CO., OF MINNEAPOLIS, MINNESOTA, A CORPORATION OF MINNESOTA.

BREAD TOASTER.

Application filed January 5, 1927. Serial No. 159,129.

This invention relates to improvements in toasters of the automatic type, wherein means is provided for breaking the circuit to the heater element at the end of a predetermined time.

In an automatic toaster, if the toaster has been in operation for some time, the parts become heated to such a degree that if the timing mechanism were allowed to function in the normal manner, the toast would be burned before the circuit to the heating element would be interrupted. It is, therefore, an object of this invention to provide means whereby a compensation can be made when super-heating takes place, so that the timing period can be reduced proportionately as the temperature increases. For this purpose this device includes a circuit controlling means, which is releasably locked to close the circuit, a thermostatic element is also employed which is arranged to receive heat from the heater element or from the toasting chamber, and mechanism controllable by the thermostatic element is employed to prematurely release the switch control means, to open the circuit, in a point of time, substantially proportionate to the increasing temperature.

Other objects are to provide a device having a toasting chamber; to provide means movable in the toasting chamber for supporting the toast, and for lowering the toast to toasting position as well as for raising the same to an accessible position, after toasting; to provide a switch for controlling a heating circuit for the toast chamber; to provide means for controlling the switch, the said means being connected with the movable toast supporting means of the toasting chamber to lower the means as the switch is closed, and to raise the means as the switch is opened; to provide a timer mechanism for controlling the length of heating period and to provide winding means for the timer; to provide detent means adapted to engage with, and releasably hold the switch control means in "switch closed" position; to arrange the winding means for holding the detent in non-locking position when the timer is unset or inoperative; to provide an arrangement whereby the winding means releases the detent which conditions the same for locking engagement to hold the switch open, as the winding means moves away from the detent to wind the clock spring in a predetermined degree; to provide means for limiting the movement of the winding means to correspondingly limit the timing interval; and to provide a device selectively controlled by the temperature of the toast chamber, or heater element to trip the detent and cause a selective premature closing of the switch substantially proportional to that rise in temperature in the toast chamber, over and above the normal temperature for which the device is designed, to prevent burning of the toast. The salient feature of the last mentioned means being to thermostatically open the heating circuit control switch substantially proportionally to a rise in temperature in the heating or toast chamber to prevent burning of the toast.

Features of the invention include the detail construction of the toaster, as well as the combinations and sub-combinations of its elements; the use of a thermostatically controlled device for prematurely opening the heater circuit control switch when super-temperatures are arrived at within the heating chamber; the means for obtaining a stepped operation of the mechanism to release and open the heating circuit control switch prematurely; the details of construction of the thermostatically controlled device; and the general arrangement of the parts for obtaining the various results set forth through the specification, including combinations and sub-combinations of the parts.

Advantages and features as well as additional objects, will be set forth in the description of the drawings forming a part of the specification, and in said drawings.

Figure 6:
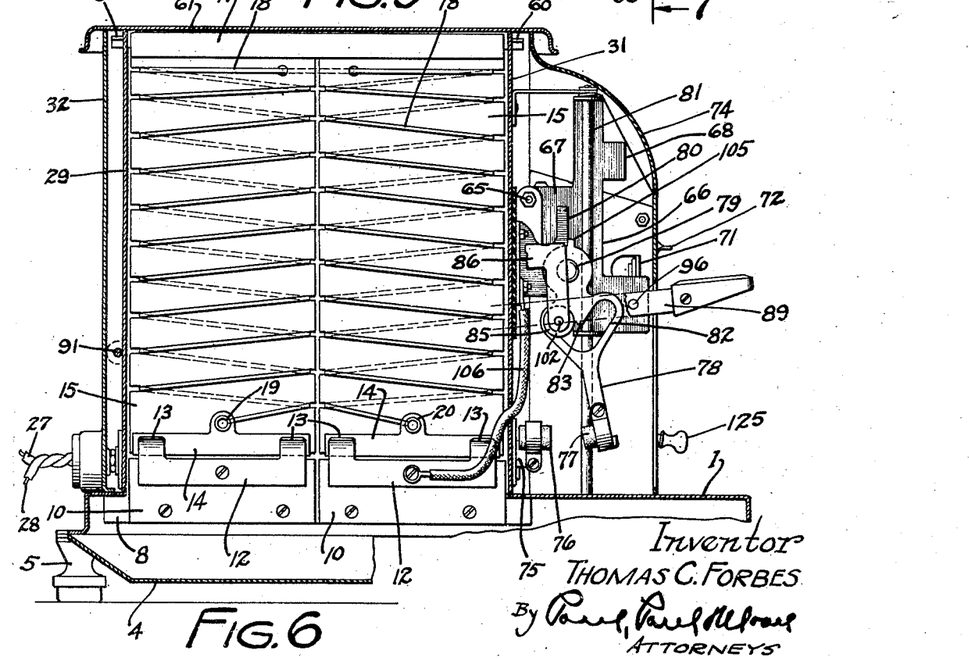
Figure 6 is a sectional view substantially on line 6—6 of Figure 7 and of Figure 10.
Figure 10:
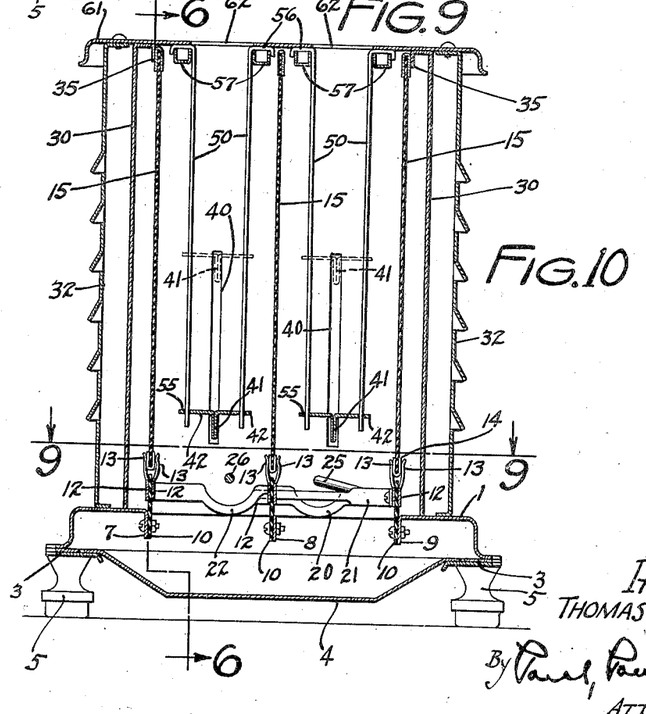
Figure 10 is a vertical section substantially on line 10—10 of Figure 8.

The frame of the device is herein composed of sheet metal plates. The base plate is indicated at 1 and is of hollow formation providing horizontal bottom flanges to which are attached longitudinally arranged strips 3 forming with the flanges, a pair of horizontal guides adapted to slidably receive a crumb tray 4. Legs 5 support the base at four corners. In order to provide openings through which the crumbs may fall to be received by the tray, see Figure 10, and in order to provide, in this instance, two toasting chambers, the base is punched to provide marginal flanges 7 and 8, and a center flange 9, which flanges are longitudinally arranged. To each flange is connected a pair of insulating strips 10 of mica or other suitable material and attached at the upper end of each strip are pairs of metallic strips 12, each having a terminal angularly related extension 13, the extensions of corresponding oppositely disposed strips being paired to form spring fingers adapted to frictionally receive the lower metallic elements 14 of the sheet-like heater elements 15, the body portions of which are preferably constructed of mica, as most clearly shown in Figure 6. Pairs of sheet-like elements 15 are connected at the top by a U-shaped metallic binding element 17 and each element 15 has a winding of metallic ribbon arranged as shown, one terminal of the ribbon 18, being connected as at 19 to one of the conductor elements 14 and being wound upwardly about the member 15, then passed to the adjacent member and wound in a downward direction to terminate as at 20 by fastening to an opposite element 14. As shown in Figure 10, the heater elements are thus made removable, their lower ends being frictionally held by the spring clips 13, and their upper ends extending to the top of the casing and being arranged in a manner now to be described.

Figure 9:
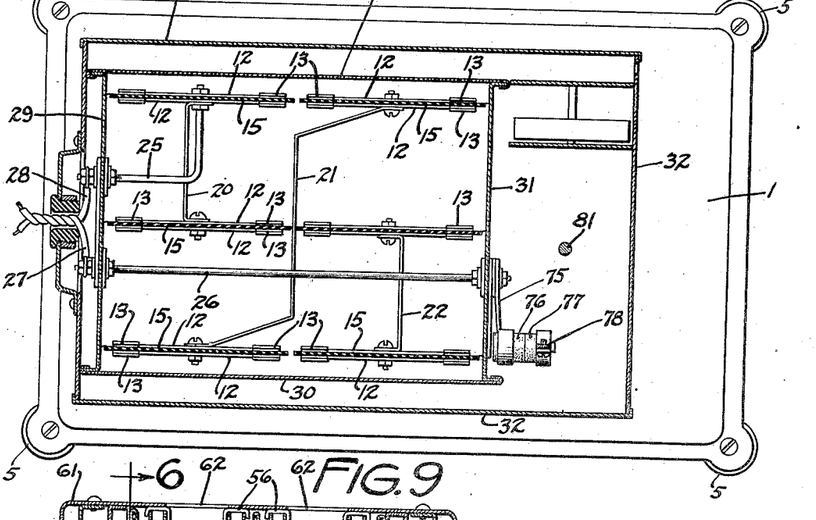
Figure 9 is a plan section substantially on line 9—9 of Figure 10.

The metallic strips 12 are connected in parallel, as shown in Figure 9, by strips 20, 21, 22. Wires or rods 25, 26 complete circuit connection as at 27, 28 with a suitable current source. The bar 25 is connected at one end, as shown, to the back plate 29 of an inner casing, the side plates of which are shown at 30 and the front plate at 31. The outer casing is generally indicated at 32. The inner casing incloses the heating chambers or it may be viewed as constituting a single heating chamber, although a type of toaster has been shown herein in which two toasting chambers are provided. Referring to Figure 10 the plates 30 have their upper edges twice bent to provide a depending flange 35 arranged to be laterally engaged by the elements 10.

An ejecting toast support is provided as a bottom for the toast chamber, which is adapted to receive the toast and cause the same to be lowered as the circuit is closed to the heating element, and is further adapted to be raised as the heating element circuit is opened. For this purpose the plates 29 and 31 are vertically slotted as at 40 to receive the bent, sheet metal translatable bottom members 41, the opposite ends of which project through and are guided by the slots 40. The elements 41 provide laterally extending arms or prongs 42 each of which has an opening traversed by a wire 50, the wires being arranged as shown in Figures 8 and 10 to form a kind of vertical grid, the wires loosely traversing the openings 55 of the prongs, and therefore conditioning the elements 41 for freedom of movement in vertical direction for the purpose in hand. Each toast supporting chamber is thus formed of two transversely spaced rows of wires, the longitudinally spaced arrangement of which permits the heat to reach the toast. The upper end of each wire is turned to form a hook 56, and the wires are supported by these hooks, upon longitudinally extending parallel supports 57 herein having the form of substantially U shaped members having their concave sides facing upwardly, and removably engaged in slots extending downwardly from the upper edges of the plate 29 and 31. The supports 56 are removably held within these slots and longitudinal movement is prevented by turned out terminal portions 60, see Figures 6 and 7. The upward movement of grid elements 50 is prevented by a cover plate 61, see Figure 10, which engages the hook portions 56 of the grid wires as shown. This plate has openings 62 through which the toast is introduced, into the toast receiving chambers formed between the grids; the openings being slightly wider than the distance between the grid forming wires. The elements 41 have right-angularly related arms at their forward ends which are connected together by the rods 65, see Figure 7, so that the elements 41 will move in unison, their movement being controlled by a slide element 66, which has an extension 67 through which the rods 65 engage, see Figures 7 and 8 as well as Figures 5 and 6. The slide element as a sheet metal stamping slides upon the vertical rod 81 suitably supported as shown.

Figure 5:
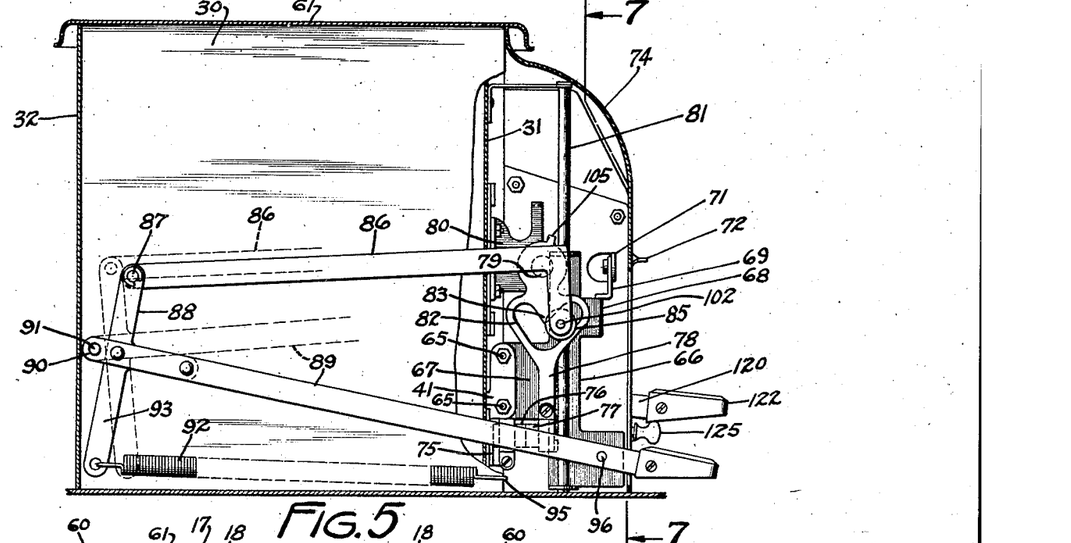
Figure 5 is a vertical sectional view substantially on line 5—5 of Figure 7.
Figure 7:
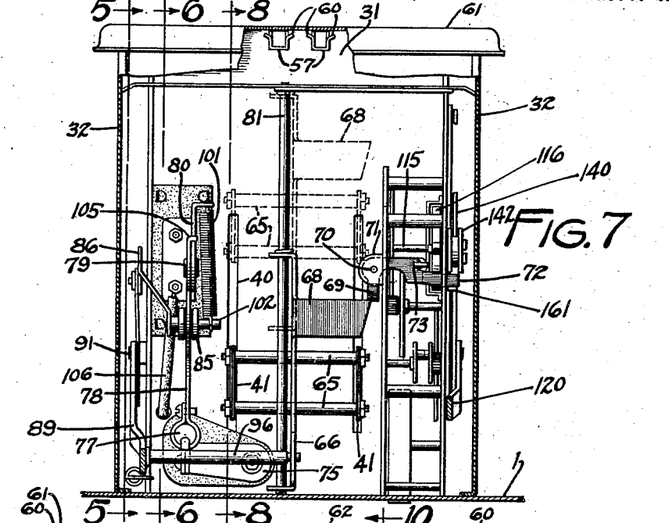
Figure 7 is a vertical sectional view approximately on line 7—7 of Figure 5.
Figure 8:
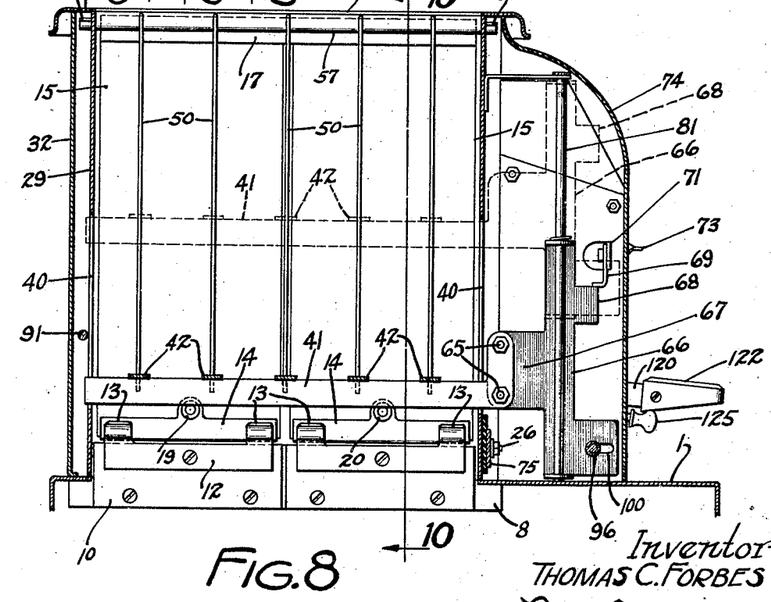
Figure 8 is a vertical sectional view approximately on line 8—8 of Figure 7.

In Figures 7 and 8, the slide element is shown in its lowermost position where it is locked, and when in this position the switch is closed as shown in Figure 5 which figure corresponds with Figures 7 and 8. The slide 66 has a right-angular extension 68, see Figure 7, adapted to engage a detent 69 pivoted at 70 to the plate 71 of the timing apparatus. This latch element 69 has the form of a bell-crank lever and has an arm 72 freely traversing the opposite plate of the winding mechanism, for engagement by a swingable winding member in a manner to be described hereafter. The element 69 further has a finger piece 73, projecting forwardly through the front cover 74 of the device, for manually releasing the timing mechanism by raising the arm 72.

Electrically connected with the bar 26 and lying at the outer side of the wall 31 of the casing, see Figure 9, and suitably insulated from the casing, is an extension 75 having a contact 76. With this contact is engaged a corresponding contact 77 of a lever 78, see Figures 5 and 6. This lever is suitably pivoted as at 79 to a bracket 80 secured to and insulated from the wall 31. The lever 78 depends and has a V-shaped slot 82 therein lying below its pivot and between the contact 77 and pivot. Engaged within this slot is a roller 85 carried at the outer end of an arm or link 86 which arm is pivoted as at 87 to an extension 88 of the lever 89, pivoted at 90 to a shaft 91 which extends transversely at the back of the inner casing. A spring 92 connected with another extension 93 of the lever 89, is connected at its forward end with the casing as shown at 95, and tends to throw the switch control lever upwardly. The lever 89 is connected as by a rod 96, see Figures 5 and 7, with the slide 66, and the slide is slotted, as at 100. (see Figure 8) to allow suitable compensative movements. Thus whenever the switch control lever is depressed to close the switch the ejector toast supports, 41, are also lowered to bring the toast entirely within the toasting chamber. The action of the contact lever 78, will be evident from an inspection of Figures 5 and 6. If the lever 89 is depressed from that position fragmentarily shown in dotted lines in Figure 5, the roller 85 then being in the position shown in Figure 6 will ride downwardly due to the outward movement of the link 86, and as soon as the roller rides over the point 83 the lever 78 will be thrown or snapped to switch closing position. When the lever 89 rises a reverse action will take place. Referring to Figure 7, a spring 101 is connected to the support 80, and to the journal 102 of the roller 85, operates to pull the link 86 upwardly to keep the roller against the inclined upper surfaces of the upper portion of the V shaped slot. A stop 105 limits the outward movement of the lever 78. The bracket 80 is suitably insulated, and electric connection between one of the terminal heating elements and the bracket is made through the wire 106, see Figures 6 and 7. The circuit can be traced by reference to Figures 9 and 6.

One of the additional important features of this device resides in the timing mechanism provided for holding the switch control element in depressed or switch closing position during a predetermined period of time. The timing device is mounted as best shown in Figure 7 at the right of the figure, and comprises side plates supporting a suitable clock mechanism, including a winding shaft 115 and spring 116 windable thereby, a suitable escapement mechanism being provided, which is not herein shown, and suitable gear connection being also provided as in ordinary clock mechanisms. When the winding shaft 115 is rotated counter clockwise direction as viewed in Figures 1, 2 and 3, it will be understood that the mechanism will be wound and the degree of winding will correspond to the degree of rotation of the shaft 115. Ordinarily this winding shaft has little more than a complete rotation for the longest timing period.

Figure 1:
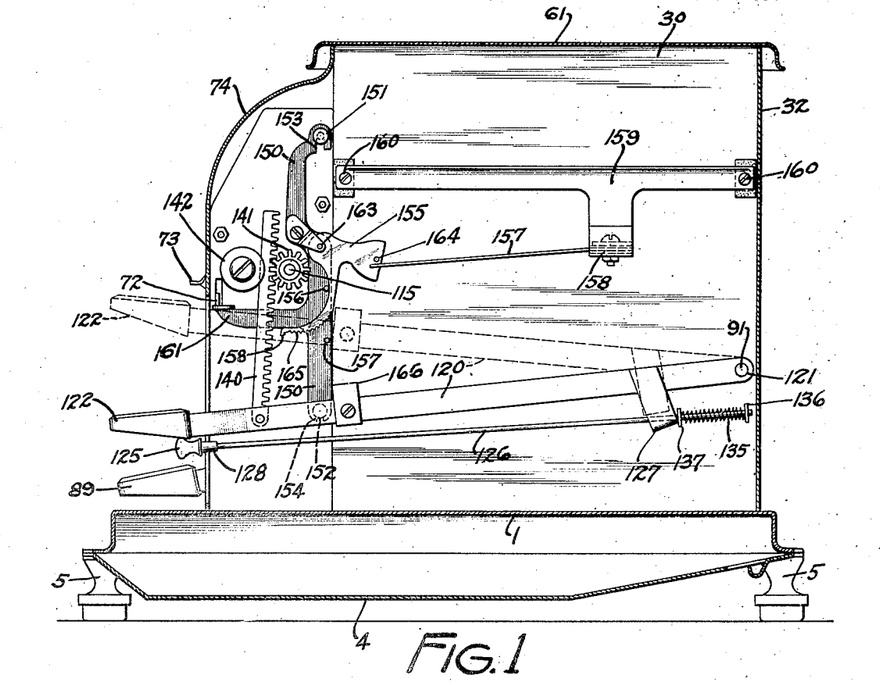
Figure 1 is a side view partly in section illustrating the improved thermostat control device and related parts, with the timing mechanism in operation, and with the thermostatic element in normal position.
Figure 2:
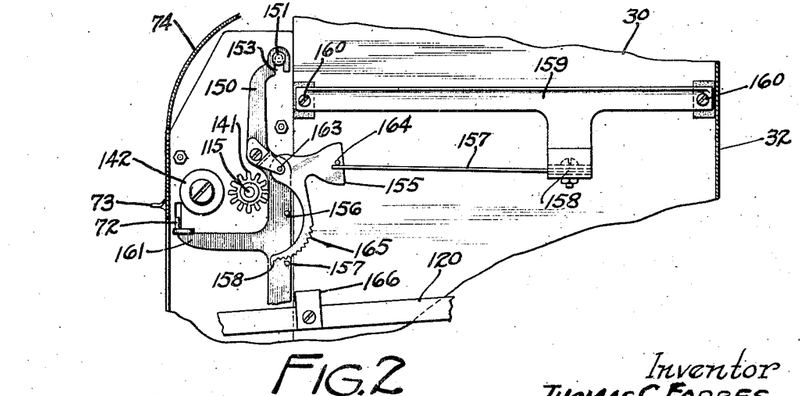
Figure 2 is a fragmentary view showing the thermostatically controlled device in one of its thermostatically adjusted positions.

Referring first to Figure 1. A movable winding element 120 is herein shown in the form of a lever pivoted at 121 to the shaft 91, and having a finger piece 122 accessible from the front of the casing in the manner of the switch control lever 89. The lever is disposed upon the outer side of the inner casing wall, and lies between the inner and outer casings, as does the lever 89. The front casing is suitably vertically slotted to allow free movement of both levers. The substantially normal position of the lever 120 is shown in dotted lines in Figure 1, and in its uppermost position its upper edge acts to raise the latch member 72 to disengage the same from the extension 68 of the slide 66, to allow the switch lever to be thrown to "switch open" position.

Figure 3:
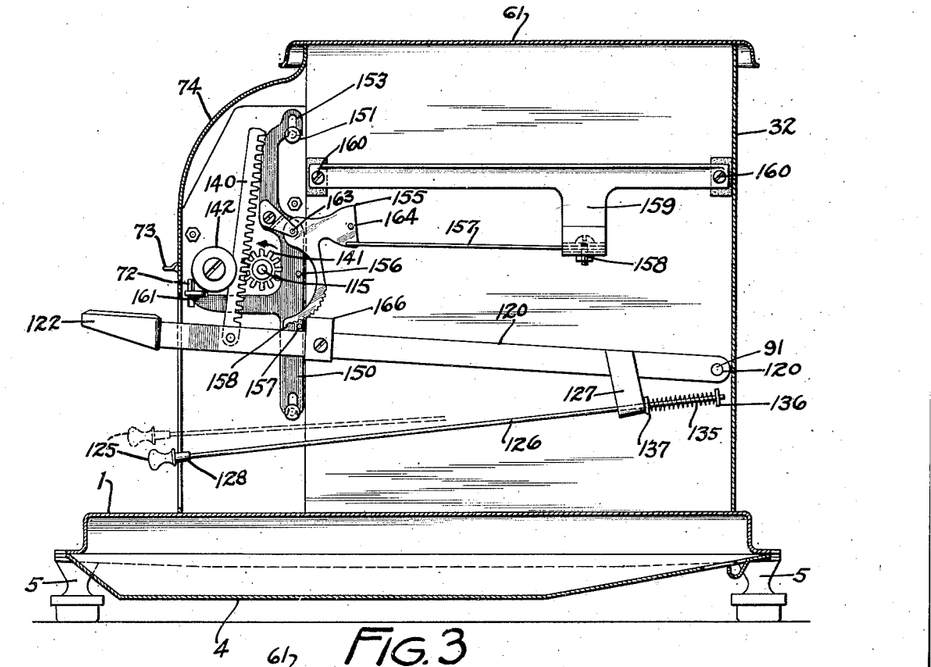
Figure 3 is a view similar to Figure 1 showing the thermostatically controlled auxiliary throw element in the act of tripping the switch control device to open the switch.
Figure 4:
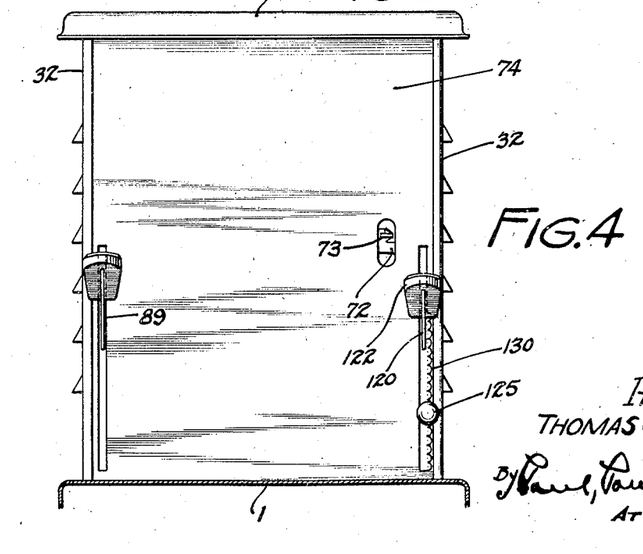
Figure 4 is a front view, with the mechanism positioned in correspondence to Figure 3, and illustrating the manner of limiting the swing of the movable winding element for the timing device.

The distance of downward travel of the lever 120 substantially from the dotted position, to that shown in full lines in Figure 1, determines the timing interval, and means is provided whereby the downward movement of the lever may be limited in varying degrees, conformably to the desired heating period. This means comprises a stop in the form of a finger hold 125 secured to the outer end of a rod 126, which freely traverses the slot in the front casing and this rod is slidably arranged in an arm 127 of the lever 120. The head of finger piece 125 has a tapered extension 128 adapted to engage in any one of the serrations or slots 130 of the slot in front cover of the machine, see Figure 4 at the right of the figure. The inner end of the rod 126 is surrounded by a coil spring 135, engaged at one end with a stationary collar 136 and at the other with a slidable collar 137 which latter collar abuttingly engages the arm 127. By this means the rod is urged inwardly and can be positively wedgingly locked after setting, the setting being accomplished by simply pulling the rod outwardly, raising it to the desired notch, and releasing. The lever 120 is connected by a pivoted rack 140 with a gear 141 fixed to the winding shaft 115 of the clock mechanism, and this rack is guided by a suitable roller 142 which also acts to hold the rack in mesh with its gear. The different positions of the lever 120 are shown in Figures 1 and 3. The dotted line position of Figure 1 indicating substantially the uppermost position, and the full line position of Figure 3 showing the intermediate position.

The length of time is controlled by the degree of winding tension, submitted to the spiral winding spring by the winding shaft, and therefore the amount of rotation of the shaft determines that tension, and also the length of time that the timer operates, or in other words, the unwinding period. The maximum amount of winding is had when the winding means is at its lowermost position or, at the greatest distance from its normal detent tripping position. Therefore, this lowermost or outermost position corresponds to the longest period during which the heating coil control circuit remains closed.

As long as the lever is in uppermost position, it engages the detent to so dispose the same, that no locking of the switch control mechanism, in "switch closed" can be had. The switch can be manually closed by this mechanism but upon releasing the lever, it will automatically move to open the switch, and interrupt the circuit to the heater coils. Thus unless the timing mechanism is operative, the heating circuit can only be maintained in closed position by manually holding the lever in that position. When, however, the timing mechanism is operative the switch will remain closed as a result of engagement of the detent with the switch control mechanism as set forth.

In the device shown, the greatest degree of clock winding is designed in correspondence to timing periods which will not burn the toast when the device is first started, and before all of its parts have been heated to such a temperature as would burn the toast. This original adjustment which provides for a timing period during which the toast will not be burned, I designate "normal". The mechanism herein, provides means whereby as the toast chamber temperature is increased to a degree above the normal; the circuit controlling switch to the heater element can be prematurely opened, substantially proportionally to the rise in temperature above the normal.

The foregoing constructions are important features of the invention but the main feature of this invention is the provision of means for thermostatically controlling the opening of the heating circuit, to prevent burning of the toast, particularly under those conditions where the toaster has been in operation over an extended time, and the parts thereof are super-heated, so that the time interval ordinarily provided by the timing mechanism is too long, resulting in burning of the toast.

I, therefore, provide a mechanism which is adapted to cause the detent 69 to be operated to release the switch control lever and open the switch prematurely, that is, sooner than it would open, if the temperature conditions were normal.

The device comprises a movable element 150 suitably guided in this instance upon pins 151, 152, engaging through slots 153, 154, of the element 150. Pivoted to the slidable element 150 is a swingable element 155 which has preferably the form indicated but which may have other forms according to the conditions under which it is to be used. In this instance the element is balanced or weighted to normally lie as shown in Figure 1. One edge of the element 155 is serrated at 165 to provide a series of stops or abutments. These serrations may be very much finer than herein shown or they may be coarser according to the work in hand, the essential feature being to provide abutments graduated or arranged in a manner to intercept, engage, or be engaged by the lever 120 in its upward course, under the influence of the clock spring and winding shaft. As herein shown the element 155 is pendently disposed, and a stop 156 prevents outward movement, a second stop 157 being provided to limit movement in the opposite direction. This stop is engageable with a small extension 158 of the swingable member 155. This element 155 also has a pin 164 engageable by a thermostatic bar 157, the bar being secured only at one end as at 158 to a conducting element, in this instance composed of copper. This element 159 is secured at opposite ends as at 160 to the outer wall of the toast chamber and being suitably heat insulated as at point of connection. The element 159 is spaced outwardly from the casing, to which it is attached only at the ends. When the wall of the heating chamber becomes super-heated the element 157 is caused in this instance to flex upwardly, causing its outer end to engage the pin 164 and swing the element 155, on its pivot 163 resulting, according to the degree of flexure of the element 157, in dispositioning one of the stepped serrations in the path of the stop 166 of the lever 120, for example as shown in Figure 3. When this takes place the translatable element 150 is moved upwardly, and its arm 161 engages the arm 72 of the detent, and raises the same prematurely as set forth above.

The thermostatic element is arranged in substantially a horizontal position with its inner edge adjacent the outer side of the wall of the toast chamber, at the opposite side of which wall the heater element is immediately adjacently disposed. Thus the thermostatic element is arranged in a manner to receive practically the same amount of heat that the toast chamber receives, it being understood that the outer casing of the device incloses the thermostatic element and its mounting. The arrangement of the casings thus form a kind of auxiliary heating chamber in which the thermostatic element is inclosed.

I claim as my invention:

1. A device of the class described including an electric heater, a switch for controlling the current to the heater, a detent for holding the switch closed, a clock mechanism, a movable element connected for winding the clock mechanism, and engageable with the detent at the end of a timing period, a movable support engageable to prematurely trip the detent, a member pivoted to the movable support, and a thermostatic element controlled by the heater temperature and arranged to move the pivoted member to interpose the same in the path of the movable winding element.

2. A device of the class described including an electric heater, a switch for controlling the current to the heater, a detent for holding the switch closed, a clock mechanism, a movable element connected for winding the clock mechanism, and adapted to be entrained when the clock is running, and engageable with the detent at the end of a timing period, a movable support engageable to prematurely trip the detent, a stop member pivoted to the movable support, and a thermostatic element controlled by the heater temperature and arranged to move the pivoted stop member to interpose the same in the path of the entrained winding element.

3. A device of the class described including an electric heater, a switch for controlling the current to the heater, a detent for holding the switch closed, a clock mechanism, a movable element connected for winding the clock mechanism, and adapted to be entrained when the clock is running, and engageable to trip the detent at the end of a timing period, a movable support engageable to prematurely trip the detent, a member pivoted to the movable support and having a series of stepped abutments, and a thermostatic element controlled by the heater temperature and arranged to move the pivoted abutment member in a degree proportional to its temperature, to selectively interpose an abutment in the path of the entrained winding element.

4. A device of the class described including an electric heater, a switch for controlling current to the heater, a detent for holding the switch in closed position, a clock mechanism, a pivoted element for winding the clock mechanism when moved in one direction, and adapted to be entrained in an opposite direction when the clock is running, said detent being trippable by the movable element at the end of the timing period, a movable support engageable to prematurely trip the detent, a pendently disposed pivoted member on the movable support arranged to be interposed in the path of the entrained winding element, and a thermostatic element controlled by heater temperature, and arranged to engage the pendently pivoted member, to dispose the same across the path of the winding member.

5. A device of the class described including an electric heater, and a clock-controlled switch therefor including a switch tripping detent, a movable element for winding the clock, said detent being trippable by the movable element, a movable support engageable to prematurely trip the detent, a stop member pivoted to the movable support, and a thermostatic element controlled by heater temperature and arranged to engage the pivoted stop member to dispose the same across the path of the winding member.

6. A device of the class described including an electric heater, and a clock-controlled switch therefor, including a switch controlling detent, a movable element for winding the clock, said detent being trippable by the movable element, a movable support engageable to prematurely trip the detent, an abutment member pivoted to the movable support and having a series of curvilinearly arranged stops, and a thermostatic element controlled by heater temperature and arranged to engage the pivoted abutment member to swing the same through an arc of predetermined degree and dispose one of the stops across the path of the winding element.

7. A device of the class described including an electric heater, a switch for controlling current to the heater, a detent for holding the switch in closed position, a clock mechanism, including a winding shaft, a movable element connected for rotating the winding shaft in winding direction, and adapted to be entrained when the clock is running, said detent being engageable by the movable element to open the switch at the end of a timing period, a movable support also engageable with the detent to prematurely trip the same, an abutment member pivoted to the movable support and weighted to normally lie outside the path of the winding element and having a series of abutments, and a thermostatic element controlled by the heater temperature, and adapted to engage the pivoted abutment member to selectively dispose an abutment across the path of the moving winding element.

8. A device of the class described including a toasting chamber and heater element therein, a switch and electrical connections for the heater element, means for closing and opening the switch, a detent for holding the switch control means in switch closed position, a clock mechanism including a winding shaft, a movable element connected for rotating the winding shaft, in winding direction and adapted to be entrained when the clock mechanism is running, said detent being engageable and trippable by the entrained element to open the switch, a movable support also engageable with the detent prematurely to trip the same, a stop member pivoted to the movable support and arranged for engagement by the entrained winding element, and a thermostatic element controlled by the toasting chamber temperature, and adapted to engage and selectively move the stop member to interpose the same in the path of the winding member.

9. A device of the class described including a heater element, a switch for controlling the current to the heater element, means for manually closing the switch, a detent for holding the switch control means in switch closed position, a clock mechanism including a winding shaft, a movable element connected with the shaft to wind the same and adapted to be entrained when the clock is running, a stop adjustable to limit the movement of the member during entrainment, said detent being engageable by the winding element at the end of a timing period to trip the detent, a movable support having an abutment engageable for tripping the detent prematurely, an abutment member pivoted to the support to swing, and when gravity controlled adapted to be in inoperative position, said member having stepped abutments curvilinearly arranged, and a thermostatic element controlled by the heater temperature, and adapted to engage and swing the abutment member in degrees varying with the temperature to selectively dispose one of the abutments across the path of the entrained winding member.

10. A device of the class described including a heater element, a switch for controlling current thereto, a detent for holding the switch control means in one position, a clock mechanism, a swinging element connected for winding the clock and engageable with the detent at the end of a timing period to trip the detent, and adapted to be entrained while the clock mechanism is running, a movable support adapted to prematurely engage the detent, a stop member pivoted to the support and having stepped abutments, and a thermostatic element controlled by heater temerature and arranged to engage and swing the stop member to dispose one of the abutments in the path of the entrained winding member.

11. A device of the class described including a heater element, a circuit and a switch therefor, a detent for controlling the switch, a clock mechanism, a pivoted lever connected for winding the clock and engageable with the detent to trip the same and adapted to be entrained while the clock mechanism is running, a movable support adapted to prematurely engage the detent, a stop member pivoted to the support, and having curvilinearly arranged abutments, and a thermostatic element controlled by heater temperature and arranged to engage and swing the stop member to dispose one of the abutments in the path of the entrained winding member.

12. A heater, an electric switch therefor, a detent for holding the switch in one position, a translatable element adapted to prematurely move the detent, a swinging element upon the translatable element having abutments, a lever engageable with the detent, timing means for entraining the lever, and a thermostatic element controlled by the heater temperature adapted to engage and dispose the same across the path of the lever, the swinging paths of the lever and swinging element being substantially perpendicular to one another.

13. A heater, an electric switch therefor, a detent for holding the switch in one position, a translatable element adapted to prematurely move the detent, a swinging element upon the translatable element having abutments, a lever engageable with the detent timing means for entraining the lever, and a thermostatic element controlled by the heater temperature adapted to engage the swinging element and dispose the same across the path of the lever.

14. A heater, a control means, a detent for holding the control means in one position, a translatable element adapted to move the detent, a swinging element upon the translatable element having abutments, a lever engageable with the detent, timing means for entraining the swinging element, and a thermostatic element controlled by the heater temperature adapted to engage the swinging element and dispose the same across the path of the lever.

15. A device of the class described including a toasting chamber and electric heater therefor, a bread support movable respectively to advance the bread to and withdraw it from toasting position with reference to the heater, a detent for holding the bread support in advanced position, a clock mechanism, a movable element connected for winding the clock and engageable to release the detent and therefore cause withdrawal of the bread support at the end of a timing period, means movable to prematurely trip the detent, a number adjustable on the movable means, and a thermostatic element arranged to move the adjustable member, and operable by heater temperature, to interpose the movable means in the path of the movable winding element before said element arrives at tripping position.

16. A device of the class described including an electric heater, a bread support movable respectively to advance the bread to and withdraw it from toasting position in reference to the heater, a detent for holding the bread support in advanced position, a clock mechanism, a movable element for winding the clock and engageable to release the detent and therefore cause withdrawal of the bread support at the end of a timing period, means movable to prematurely trip the detent, a member adjustable on the movable means, a thermostatic element arranged to move the adjustable member, said element operable as the result of heater temperature to interpose the member in the path of the movable winding element before this element arrives at tripping position, a switch for controlling current to the heater and including a movable element and connections between the movable element and the toast support whereby the toast support is advanced, as the switch is closed, and whereby when the toast support is released by the detent to be withdrawn, the switch is opened.

In witness whereof, I have hereunto set my hand this 23rd day of December, 1926.

THOMAS C. FORBES.